(12) United States Patent
Huang

(10) Patent No.: US 9,197,454 B2
(45) Date of Patent: Nov. 24, 2015

(54) DIFFERENTIAL SIGNAL TRANSMITTERS

(71) Applicant: VIA TECHNOLOGIES, INC., New Taipei (TW)

(72) Inventor: Chun-Che Huang, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 0 days.

(21) Appl. No.: 14/156,700

(22) Filed: Jan. 16, 2014

(65) Prior Publication Data

US 2015/0200791 A1 Jul. 16, 2015

(51) Int. Cl.
*H04L 27/00* (2006.01)
*H04L 25/02* (2006.01)

(52) U.S. Cl.
CPC .................................. *H04L 25/0272* (2013.01)

(58) Field of Classification Search
CPC ...... H04L 25/0272; G09G 5/006; H02M 1/38
See application file for complete search history.

(56) References Cited

U.S. PATENT DOCUMENTS

| 2003/0085756 | A1* | 5/2003 | Ono | G05F 3/262 327/541 |
| 2004/0140842 | A1* | 7/2004 | Lee et al. | 327/333 |
| 2008/0278122 | A1* | 11/2008 | Chi | 323/220 |
| 2009/0261896 | A1* | 10/2009 | Tzu-Chien | H03K 19/0016 327/543 |
| 2012/0176163 | A1* | 7/2012 | Wu | 327/108 |
| 2013/0342243 | A1* | 12/2013 | Chen et al. | 327/109 |

* cited by examiner

*Primary Examiner* — Sam K Ahn
*Assistant Examiner* — Fabricio R Murillo Garcia
(74) *Attorney, Agent, or Firm* — McClure, Qualey & Rodack, LLP

(57) ABSTRACT

A differential signal transmitter circuit includes an output driver circuit and a leakage current preventing circuit. The output driver circuit is configured to transmit a pair of differential signals according to a supply power. The leakage current preventing circuit is coupled to the supply power and configured to couple the supply power to the output driver circuit in a power on state and decouple the supply power from the output driver circuit in a power off state.

10 Claims, 5 Drawing Sheets

DIFFERENTIAL SIGNAL TRANSMITTERS

BACKGROUND OF THE INVENTION

1. Field of the Invention

The invention relates to a differential signal transmitter, and more particularly to a differential signal transmitter suitable for high-speed differential signal transmission.

2. Description of the Related Art

High definition multimedia interface (HDMI) is a full digital video and audio interface and is suitable for satellite signal receivers, Blu-ray Disc players, computers and TVs. The connections among the various pieces of equipment can be simplified to one single HDMI cable to transmit uncompressed and high-quality video and audio signals. A standard HDMI interface has nineteen pins including the pins for transmitting data and clock signals and a display data channel (DDC) pin set for transmitting signals between two connected equipment.

The transmission of the HDMI signals, which are the high-speed differential signals, is a kind of point-to-point protocol, which means a signal source corresponds to a monitor and transmits a video signal to the monitor. In order to enhance the transmission performance of the high-speed differential signals, a novel structure of differential signal transmitter is required.

BRIEF SUMMARY OF THE INVENTION

Differential signal transmitter circuits are provided. An exemplary embodiment of a differential signal transmitter circuit comprises an output driver circuit and a leakage current preventing circuit. The output driver circuit is configured to transmit a pair of differential signals according to a supply power. The leakage current preventing circuit is coupled to the supply power and configured to couple the supply power to the output driver circuit in a power on state and decouple the supply power from the output driver circuit in a power off state.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
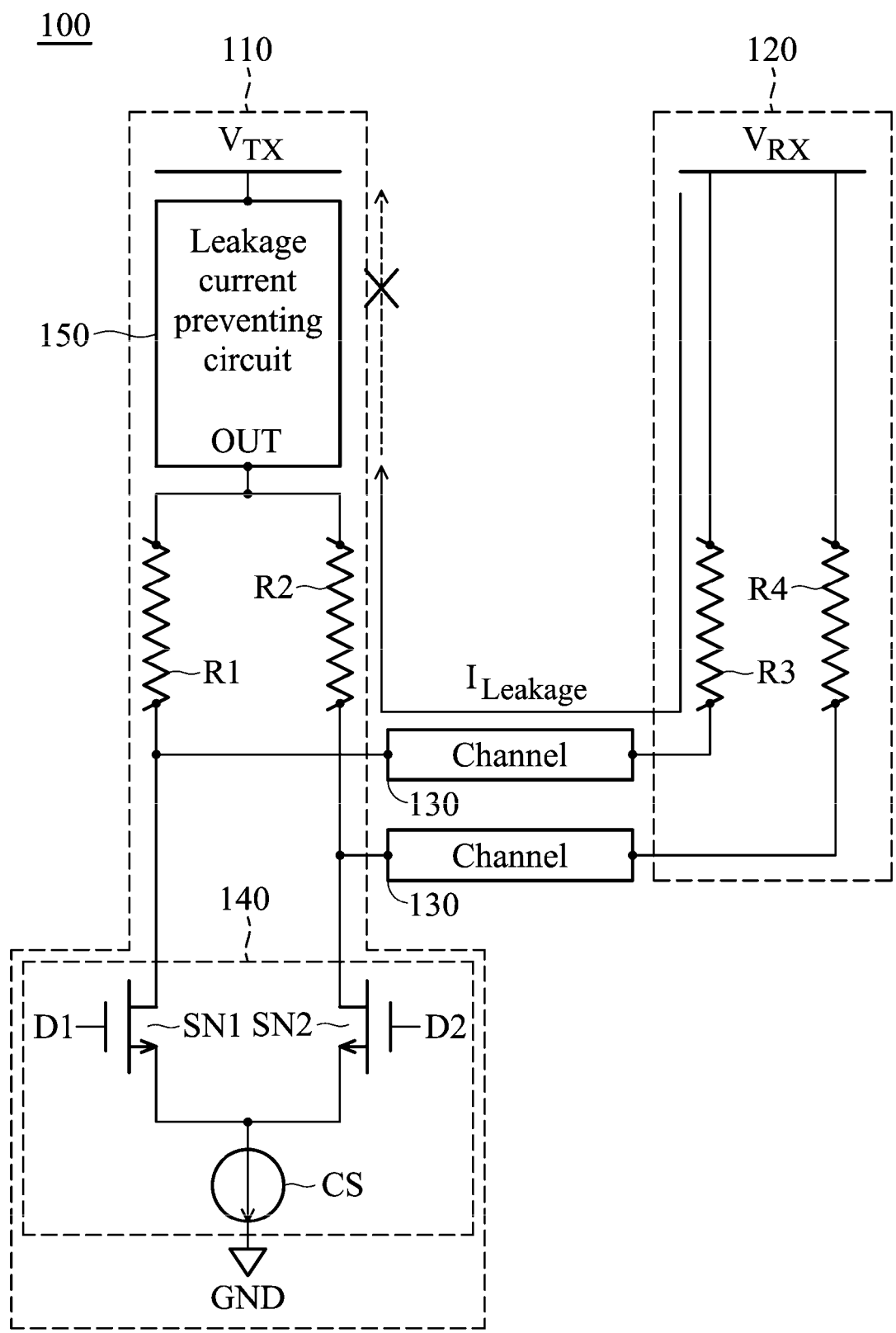
FIG. 1 shows a block diagram of a communications system according to an embodiment of the invention.

FIG. 1 shows a block diagram of a communications system according to an embodiment of the invention. The communications system 100 may comprise a differential signal transmitter circuit 110, a differential signal receiver circuit 120 and communications channels 130. The differential signal transmitter circuit 110 is configured to transmit a pair of differential signals via communications channels 130 according to data signals D1 and D2, and may be comprised in an SOC system or an electronic device, such as a cellular phone, a tablet computer, a DVD player, or others. The differential signal receiver circuit 120 is configured to receive the pair of differential signals transmitted according to data signals D1 and D2 through the communications channels 130, and may be comprised in an SOC system or an electronic device, such as a TV, a monitor, or others. The communications channels 130 may be one or a combination of chip package, PCB trace, connectors, cables or others.

According to an embodiment of the invention, the differential signal transmitter circuit 110 may comprise an output driver circuit 140, a pair of resistors R1 and R2, and a leakage current preventing circuit 150. The output driver circuit 140 is configured to transmit the pair of differential signals according to data signals D1 and D2 to the communications channels 130. The output driver circuit 140 may comprise a current source CS and two switching elements. One switching element is coupled between the current source CS and resistor R1 and receiving the data signal D1, and the other one is coupled between the current source CS and resistor R2 and receiving the data signal D2. According to an embodiment of the invention, the switching elements may be NMOS transistors SN1 and SN2 but are not limited thereto. In other embodiments the switching elements may be bipolar junction transistors (BJT) or other types of field-effect transistors (FET).

The pair of resistors R1 and R2 is coupled to the output driver circuit 140 for matching the impendence with the pair of resistors R3 and R4 in the differential signal receiver circuit 120. According to an embodiment of the invention, the resistances of the resistors R1, R2, R3 and R4 are preferably designed as 50 Ohm. The leakage current preventing circuit 150 is coupled between the supply power $V_{TX}$ and the output driver circuit 140, and is configured to couple the supply power $V_{TX}$ to the output driver circuit 140 in a power on state and decouple the supply power $V_{TX}$ from the output driver circuit 140 in a power off state. To be more specific, the leakage current preventing circuit 150 may provide the supply power $V_{TX}$ to the output driver circuit 140 in a power on state and prevent a leakage current $I_{Leakage}$ from flowing from the communications channel 130 to the supply power $V_{TX}$ in a power off state. Note that in some embodiments of the invention, the pair of resistors R1 and R2 may also be regarded as a part of the output driver circuit 140, and the invention should not be limited thereto.

The switching between the power on state and the power off state is controlled by a power signal $S_{Power}$ of a system or electronic device comprising the differential signal transmitter circuit 110. When the system or electronic device is powered on, the power signal $S_{Power}$ has a high voltage level (e.g., a non-zero voltage), and the system or electronic device operates in the power on state. When the system or electronic device is powered off, the power signal $S_{Power}$ has a low voltage level (e.g., a zero voltage), and the system or electronic device enters the power off state. Note that the voltage level of the supply power $V_{TX}$ may be different from the voltage level of the power signal $S_{Power}$.

Conventionally, when the system or electronic device comprising the differential signal transmitter circuit enters the power off state but the system or electronic device comprising the differential signal receiver circuit still operates in the power on state, the leakage current $I_{Leakage}$ flowing from the differential signal receiver circuit may appear at the output driver circuit of the differential signal transmitter circuit through the communications channels and may cause undesired effects. For example, when the system or electronic device comprising the differential signal transmitter circuit has a special power on/off sequence, the leakage current $I_{Leakage}$ may cause the system or electronic device to be unable to power up and then malfunction.

However, since in the embodiment of the invention, the differential signal transmitter circuit 110 comprises the leakage current preventing circuit 150 to prevent the leakage current $I_{Leakage}$ from flowing from the communications channel 130 to the supply power $V_{TX}$ in the power off state, the above-mentioned leakage current problem can be solved.

Figure 2:
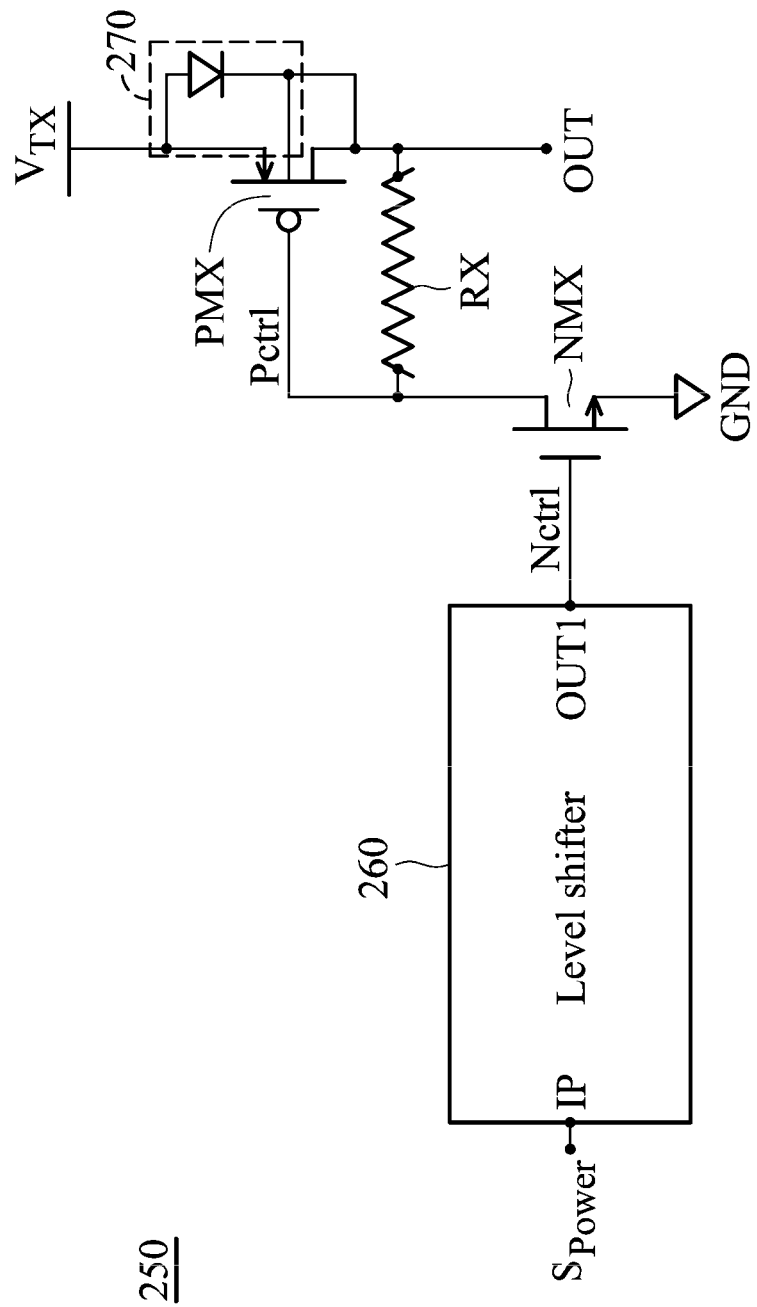
FIG. 2 shows a block diagram of a leakage current preventing circuit according to an embodiment of the invention.

FIG. 2 shows a block diagram of a leakage current preventing circuit according to an embodiment of the invention. The leakage current preventing circuit 250 may comprise a first switching element, a second switching element and a resistor RX. The first switching element is coupled between the supply power $V_{TX}$ and an output node OUT. The leakage current preventing circuit 150/250 is coupled to the pair of resistors R1 and R2 (or, the output driver circuit 140 when the pair of resistors R1 and R2 are regarded as a part of the output driver circuit 140) at the output node OUT. The second switching element is coupled between the first switching element and the ground node GND. The resistor RX is coupled between the output node OUT and a connection node Pctrl of the first switching element and the second switching element. The resistor RX may be a high-value resistor. According to an embodiment of the invention, the resistance of the resistor RX can be designed as 50 KOhm.

According to an embodiment of the invention, the first switching element may be a transistor comprising a first electrode coupled to the supply power $V_{TX}$, a second electrode coupled to the output node OUT and a control electrode coupled to the connection node Pctrl, and the second switching element may be a transistor comprising a first electrode coupled to the ground node GND, a second electrode coupled to the connection node Pctrl and a control electrode coupled to the power signal $S_{Power}$.

In a preferred embodiment of the invention, the first switching element may be a PMOS transistor PMX comprising a source coupled to the supply power $V_{TX}$, a drain coupled to the output node OUT, and a gate coupled to the connection node Pctrl. The drain of the PMOS transistor PMX may further be coupled to a body of the PMOS transistor PMX.

The second switching element may be an NMOS transistor NMX comprising a source coupled to the ground node GND, a drain coupled to the connection node Pctrl, and a gate coupled to the power signal $S_{Power}$.

In the power on state, the power signal $S_{Power}$ has a high voltage level. The second switching element (e.g. the transistor NMX) is turned on in response to the power signal $S_{Power}$, thereby pulling low the voltage at the connection node Pctrl to near zero volts. The first switching element (e.g. the transistor PMX) is turned on in response to the voltage at the connection node Pctrl. Therefore, the supply power $V_{TX}$ is provided to the output driver circuit 140. Although there may be some leakage current flowing from the output node OUT via the resistor RX to the drain of the transistor NMX, such a leakage current is negligible since the resistor RX has a high-value resistance.

According to an embodiment of the invention, when the first switching element is implemented by a transistor (e.g. the transistor PMX), the transistor may be designed to have a large aspect ratio (W/L) and a small turn-on resistance. Therefore, when the first switching element is turned on, the supply power $V_{TX}$ can be provided to the output driver circuit 140 with almost completely the same voltage level and without influencing the impedance matching.

In the power off state, the power signal $S_{Power}$ has zero voltage, and there is no power for the output driver circuit 140, either. The second switching element (e.g. the transistor NMX) is turned off in response to the power signal $S_{Power}$. Meanwhile, if the system or electronic device comprising the differential signal receiver circuit 120 still operates in the power on state, the supply power V (e.g. 3.3V) is presented at the output node OUT. The first switching element (e.g. the transistor PMX) is turned off in response to the high voltage at the output node OUT coupled to the gate of the transistor PMX via the resistor RX. Thus, the leakage current $I_{Leakage}$ will not flow to the supply power $V_{TX}$.

According to an embodiment of the invention, when the first switching element is implemented by a transistor (e.g. the transistor PMX), the drain of the PMOS transistor PMX may further be coupled to a body of the PMOS transistor PMX, such that the intrinsic body diode 270 is reversed biased in the power off state. Since the intrinsic body diode 270 is reversed biased and the voltage at the gate of the transistor PMX is pulled high, the transistor PMX is completely turned off. Therefore, the leakage current $I_{Leakage}$ can be completely blocked from flowing to the supply power $V_{TX}$.

According to an embodiment of the invention, the leakage current preventing circuit 250 may further comprise a level shifter 260 coupled to the second switching element and configured to shift a voltage level of the power signal $S_{Power}$ to control the second switching element to couple the supply power $V_{TX}$ to the output driver circuit 140 in the power on state, and to provide a low voltage level to the second switching element to decouple the supply power $V_{TX}$ from the output driver circuit 140 in the power off state. For example, the voltage level of the power signal $S_{Power}$ may range from 0V~1.2V, and the level shifter 260 may shift the voltage level to range from 0V~3.3V in order to, for example, correspond to the voltage level of the supply power $V_{TX}$.

Figure 3:
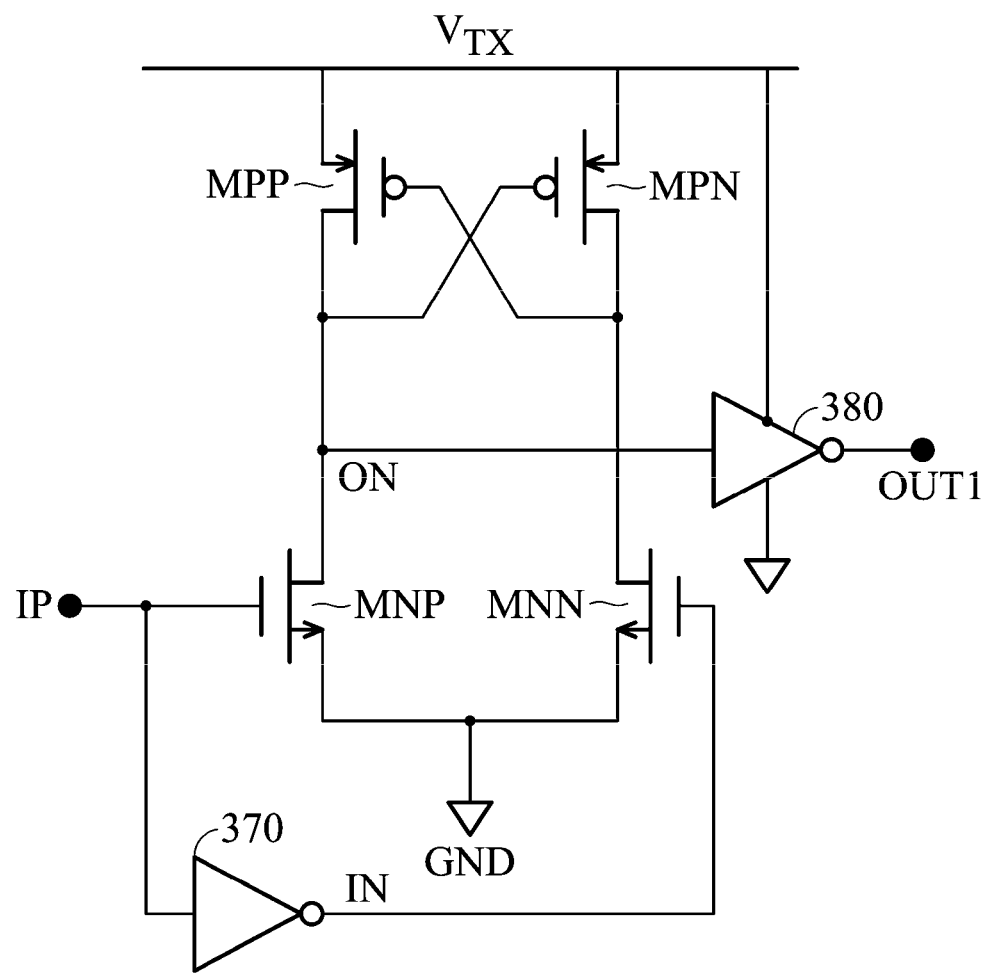
FIG. 3 shows an exemplary circuit diagram of a level shifter according to an embodiment of the invention.

FIG. 3 shows an exemplary circuit diagram of a level shifter according to an embodiment of the invention. The level shifter 360 may comprise a pair of input switching elements configured to receive the power signal $S_{Power}$, a pair of cross-coupled switching elements coupled between the supply power $V_{TX}$ and the pair of input switching elements, and inverters 370 and 380. The pair of input switching elements is controlled according to the power signal $S_{Power}$ and may couple the input node ON of the inverter 380 to the ground node according to the power signal $S_{Power}$. The pair of input switching elements may be a pair of NMOS transistors MNP and MNN. The pair of cross-coupled switching elements may couple the input node ON of the inverter 380 to the supply power $V_{TX}$ according to the power signal $S_{Power}$. The pair of cross-coupled switching elements may be a pair of cross-coupled PMOS transistors MPP and MPN.

The inverter 370 may have an input node coupled to an input node IP of the level shifter 360 and the inverter 380 may have an output node coupled to an output node OUT1 of the level shifter 360. The inverter 370 is coupled to the power signal $S_{Power}$ and may control one of the pair of input switching elements according to an inverse of the power signal $S_{Power}$. The inverter 380 may control the second switching element of the leakage current preventing circuit according to a voltage at the input node ON. The inverters 370 and 380 may be driven by different supply voltages; for example, the inverter 370 may have a supply voltage corresponding to the voltage level of the power signal $S_{Power}$ (e.g., 1.2V) while the inverter 380 may have a supply voltage corresponding to the voltage level of the supply power $V_{TX}$ (e.g., 3.3V). Note that in some embodiments of the invention, the inverter 380 may also be regarded as not comprised in the level shifter 360, and the invention should not be limited thereto. The voltage at the input node ON of the inverter 380 may be generated by the level shifter 360 by shifting the voltage level of the power signal $S_{Power}$.

When the power signal $S_{Power}$ has a non-zero voltage (e.g. 1.2V), the NMOS transistor MNP is turned on, thereby pulling down the voltage at the input node ON of the inverter 380. Therefore, the inverter 380 may output a signal having a high voltage level (e.g. 3.3V) as the supply power $V_{TX}$. When the power signal $S_{Power}$ has zero voltage, the NMOS transistor MNN is turned on, thereby pulling down the voltage at the gate of the PMOS transistor MPP and turning on the PMOS transistor MPP. When the PMOS transistor MPP is turned on, the voltage at the input node ON of the inverter 380 is pulled high to a high voltage level (e.g. 3.3V) as the supply power $V_{TX}$. Therefore, the inverter 380 may output a zero volts signal.

Figure 4:
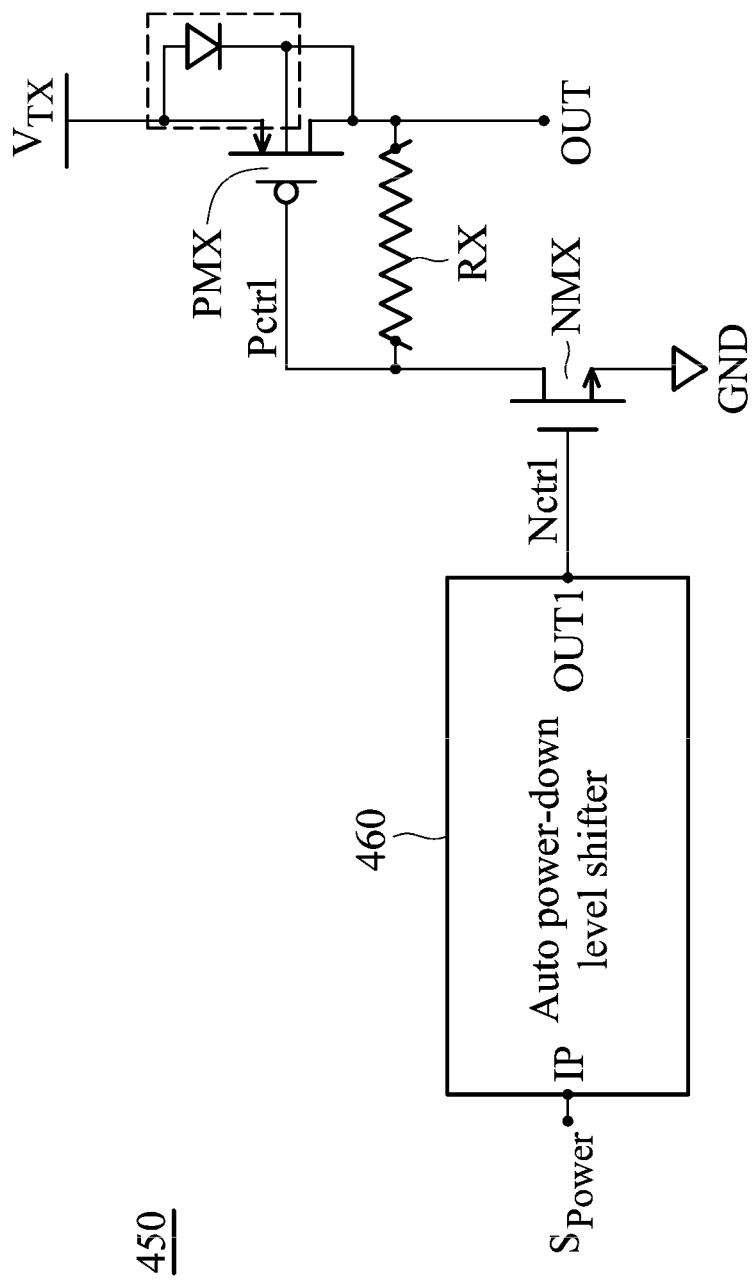
FIG. 4 shows a block diagram of a leakage current preventing circuit according to another embodiment of the invention.

FIG. 4 shows a block diagram of a leakage current preventing circuit according to another embodiment of the invention. Operations and most of the elements in the leakage current preventing circuit 450 are the same as the leakage current preventing circuit 250 as shown in FIG. 2. Therefore, descriptions of the same operations and elements in the leakage current preventing circuit 450 may refer to the descriptions of the leakage current preventing circuit 250, and are omitted here for brevity. According to an embodiment of the invention, unlike the leakage current preventing circuit 250, the leakage current preventing circuit 450 may further comprise an auto power-down level shifter 460 coupled to the second switching element and configured to shift a voltage level of a power signal $S_{Power}$ to control the second switching element to couple the supply power $V_{TX}$ to the output driver circuit 140 in the power on state, and to provide a low voltage level to the second switching element to decouple the supply power $V_{TX}$ from the output driver circuit 140 in the power off state.

Figure 5:
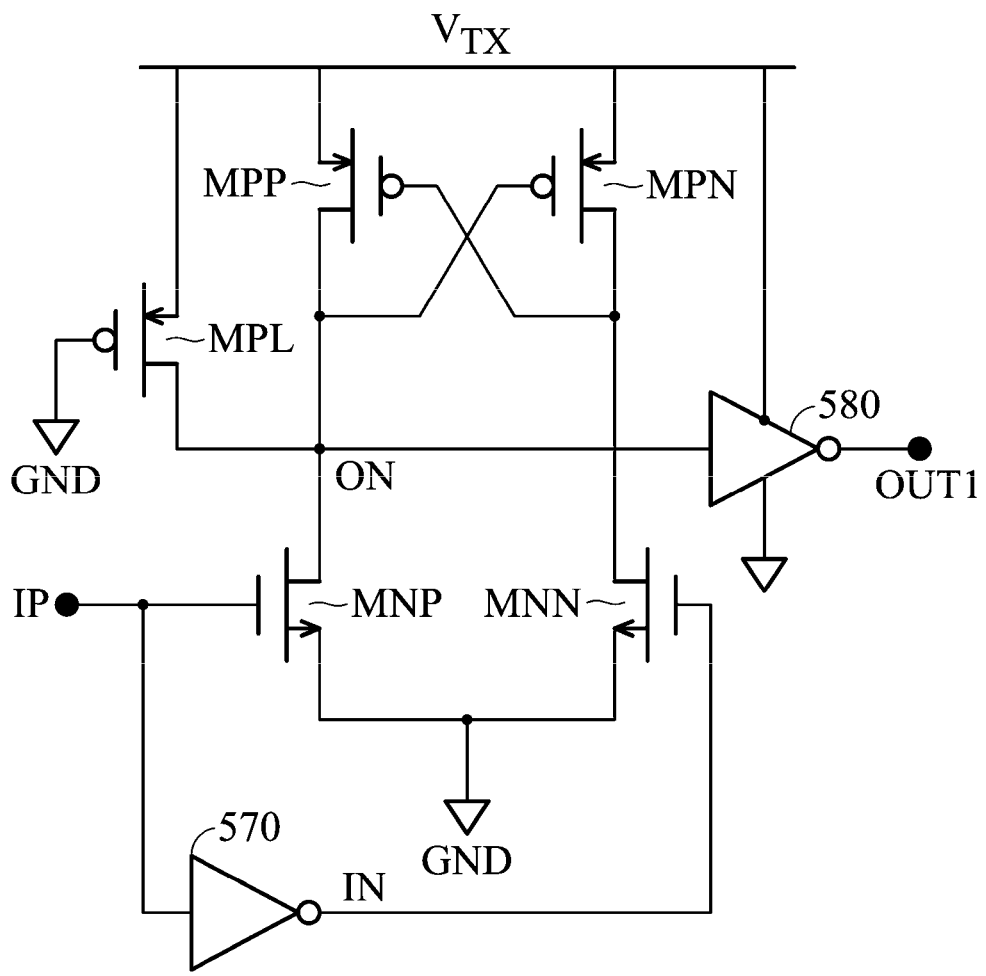
FIG. 5 shows an exemplary circuit diagram of an auto power-down level shifter according to an embodiment of the invention.

FIG. 5 shows an exemplary circuit diagram of an auto power-down level shifter according to an embodiment of the invention. The auto power-down level shifter 560 may comprise a level shifter, such as the level shifter 360 as shown in FIG. 3, and a switching element coupling the supply power $V_{TX}$ to the input node ON of the inverter 580. Descriptions of the operations and elements of the level shifter in the auto power-down level shifter 560 may refer to the descriptions of the level shifter 360, and are omitted here for brevity.

According to an embodiment of the invention, the switching element added in the auto power-down level shifter 560 may be a PMOS transistor MPL comprising a gate coupled to the ground node GND, a source coupled to the supply power $V_{TX}$ and a drain coupled to the input node ON of the inverter 580. The PMOS transistor MPL may be designed as a long length transistor. For example, a length of the channel of the PMOS transistor MPL is much greater than a width of the channel of the PMOS transistor MPL, such that the PMOS transistor MPL may have a small W/L ratio. In one of several preferred embodiments of the invention, the width may be designed as 0.5 µm-1 µm, and the length may be designed as 10 µm-20 µm. The purpose of adding a long length PMOS transistor MPL in the auto power-down level shifter 560 is to weakly pull-up a voltage level at the input node ON of the inverter 580. To be more specific, for the case when the system or electronic device comprising the differential signal transmitter circuit 110 is powered off, both the nodes IP and IN (the output of the inverter 570) may have zero voltage since the inverter 570 may not have supply voltage. The voltage level at node ON and thus the voltage at the output node OUT1 may become undetermined, and the transistor NMX may not be properly turned off, resulting in the leakage current $I_{Leakage}$. To solve this problem, by weakly pulling-up the voltage level at the input node ON of the inverter 580 constantly via the PMOS transistor MPL, the inverter 580 may ensure that the output node OUT1 remains at ground voltage when the system or electronic device comprising the differential signal transmitter circuit 110 is powered off. Since the PMOS transistor MPL is a long length transistor, it does not significantly affect the voltage at node ON when it is pulled down by the transistor MNP during power on state.

According to the embodiments of the invention, the proposed differential signal transmitter circuit 110 is suitable for high-speed signal transmission and is applicable in high-speed serial link interface, such as HDMI, DVI (Digital Visual Interface) and TMDS (Transition Minimized Differential Signaling) transmission. The pair of differential signals may be TMDS (Transition Minimized Differential Signaling) signals. With the leakage current preventing circuit 150/250/450, the eye diagram and high-speed signal transmission performance of the differential signal transmitter circuit 110 can be greatly improved and the leakage current problem as described above can be solved.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A differential signal transmitter circuit, comprising:
an output driver circuit, configured to transmit a pair of differential signals according to a supply power; and
a leakage current preventing circuit, coupled to the supply power and configured to couple the supply power to the output driver circuit in a power on state and decouple the supply power from the output driver circuit in a power off state,
wherein the leakage current preventing circuit comprises:
a first transistor, comprising a first electrode directly connected to the supply power, a second electrode directly connected to the output driver circuit and a gate electrode;
a second transistor, comprising a first electrode directly connected to a ground node, a second electrode directly connected to the gate electrode of the first transistor and a gate electrode coupled to a power signal; and
a resistor, coupled between the output driver circuit and the gate electrode of the first transistor,
wherein the power signal has a high voltage level in the power on state and a low voltage level in the power off state.

2. The differential signal transmitter circuit as claimed in claim 1, wherein the first transistor is a PMOS transistor having a body coupled to a drain of the PMOS transistor and the second transistor is an NMOS transistor.

3. The differential signal transmitter circuit as claimed in claim 1, wherein the leakage current preventing circuit further comprises:

an auto power-down level shifter, coupled to the second transistor and configured to shift a voltage level of a power signal to control the second transistor to couple the supply power to the output driver circuit in the power on state, and to provide a low voltage level to the second transistor to decouple the supply power from the output driver circuit in the power off state.

4. The differential signal transmitter circuit as claimed in claim 3, wherein the auto power-down level shifter comprises:

a first inverter, driven by the supply power and comprising an input node, controlling the second transistor according to a voltage at the input node;

a level shifter, generating the voltage at the input node of the first inverter by shifting the voltage level of the power signal in the power on state; and a third switching element, coupling the supply power to the input node of the first inverter.

5. The differential signal transmitter circuit as claimed in claim 4, wherein the level shifter comprises:

a pair of input switching elements, controlled according to the power signal, and coupling the input node of the first inverter to the ground node according to the power signal;

a pair of cross-coupled switching elements, coupled between the supply power and the pair of input switching elements, and coupling the input node of the first inverter to the supply power according to the power signal; and a second inverter, coupled to the power signal and controlling one of the pair of input switching elements according to an inverse of the power signal.

6. The differential signal transmitter circuit as claimed in claim 5, wherein the second inverter is driven by a supply voltage corresponding to the voltage level of the power signal, and wherein the voltage level of the power signal is different from the supply power.

7. The differential signal transmitter circuit as claimed in claim 4, wherein the third switching element is a PMOS transistor comprising a source coupled to the supply power, a drain coupled to the input node of the first inverter, and a gate coupled to the ground node, and wherein the third switching element has a channel with a width of 0.5 μm-1 μm and a length of 10 μm-20 μm.

8. The differential signal transmitter circuit as claimed in claim 1, wherein the pair of differential signals are Transition Minimized Differential Signaling (TMDS) signals.

9. The differential signal transmitter circuit as claimed in claim 1, wherein the output driver circuit comprises:

a current source;

a fourth switching element, coupled between the current source and the leakage current preventing circuit, and receiving a first data signal; and a fifth switching element, coupled between the current source and the leakage current preventing circuit, and receiving a second data signal, wherein the pair of differential signals are transmitted by the output driver circuit according to the first and second data signals.

10. The differential signal transmitter circuit as claimed in claim 9, wherein the output driver circuit further comprises a pair of resistors, each coupled between the leakage current preventing circuit and the fourth or fifth switching element.

* * * * *